July 2, 1968  M. A. ANDERSON  3,390,781
FOOD STRAINER
Filed Sept. 27, 1966
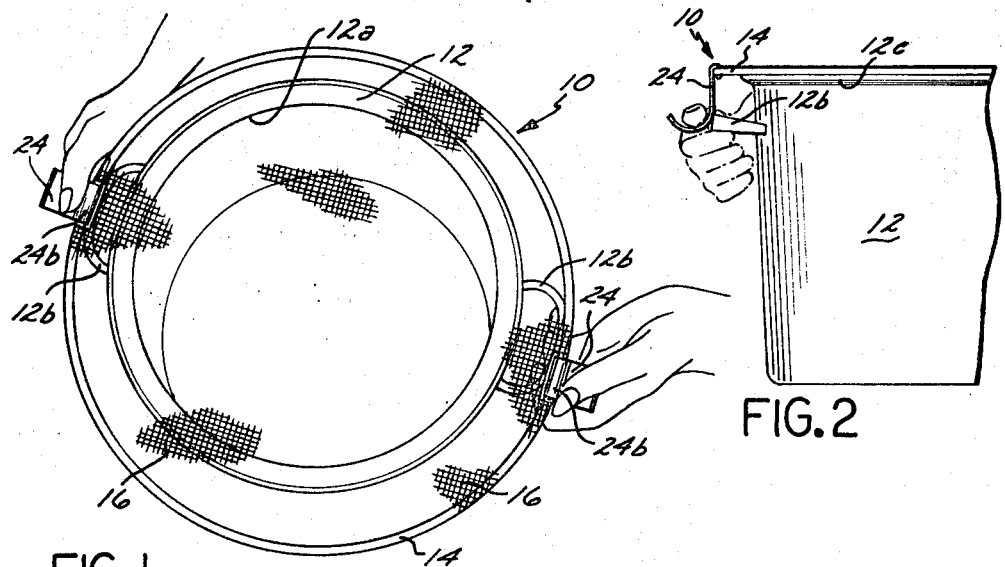
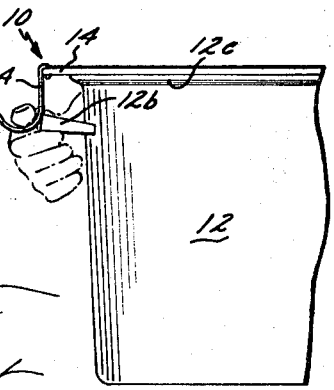
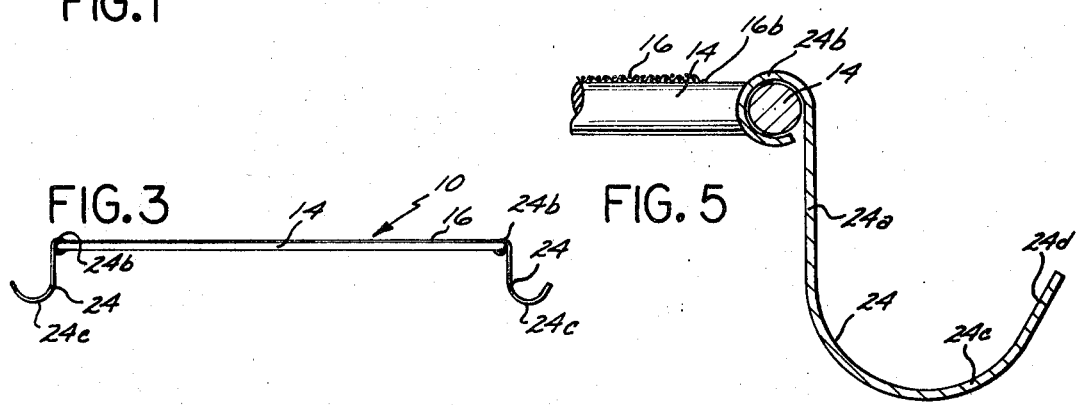
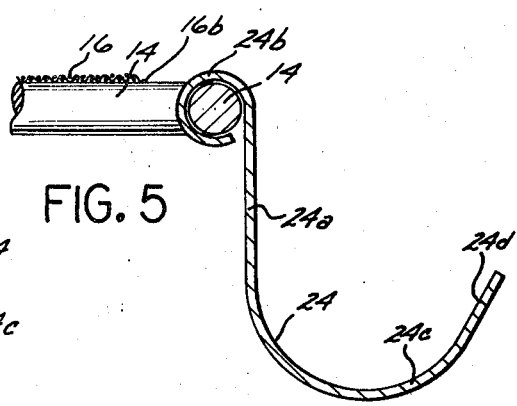
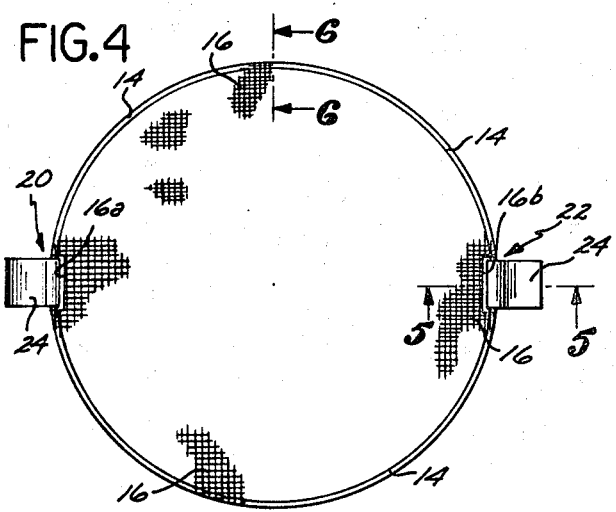
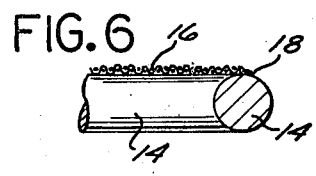
INVENTOR.
MARTHA A. ANDERSON
BY
ATTORNEY

United States Patent Office 3,390,781
Patented July 2, 1968

3,390,781
FOOD STRAINER
Martha A. Anderson, Costa Mesa, Calif.
(454 Kenneth St., Campbell, Calif. 95008)
Filed Sept. 27, 1966, Ser. No. 582,319
2 Claims. (Cl. 210—465)

ABSTRACT OF THE DISCLOSURE

A strainer for use with containers of different sizes. The strainer having pivotal grips formed with reversely bent end portions, such grips being pivotally connected to the strainer frame to enable such grips to be directed toward the handle of the container irrespective of the size of the latter.

---

The present invention relates generally to food strainers, and more particularly to strainers for use with containers or cooking utensils for straining foodstuffs of various kinds.

Various types and styles of strainers have heretofore been provided, but virtually all of them have been less than satisfactory in use with cooking utensils. That is, there have been strainers of different sizes and shapes having handles of different lengths and configurations. However, the handles and/or the size of the strainer itself has been such as to work unsatisfactorily with the average sauce pan or other cooking container.

For some period of time it has been deemed desirable to have a strainer which can be easily and conveniently held across the opening of a sauce pan so that the pan and strainer can be tipped or inverted as a unit. To accomplish this it was felt that the strainer should be so constructed as to be easily held against the pan itself.

Prior devices to accomplish the above purposes have generally comprised a relatively long handle for use in holding the strainer portion over the opening. Thus, it required exceptional manual coordination and dexterity to simultaneously invert the pan or container with one hand and the strainer with the other hand. As will be readily apparent, this, it was discovered, is extremely difficult and hence the foodstuffs being strained frequently poured from the container, pass the strainer itself.

It is an object of the present invention to provide a strainer for foodstuffs and the like which can be conveniently and effectively gripped in conjunction with a container or sauce pan.

Another object of the present invention is to provide a strainer for foodstuffs as characterized above, having grip means such that the strainer can be tightly held against the entire open end of the pan.

Another object of the present invention is to provide a strainer for foodstuffs as characterized above, which is so adapted that it can be used in conjunction with pans and containers of various different sizes and shapes.

A further object of the present invention is to provide a strainer for foodstuffs as characterized above, which can be conveniently used with pans having handles at different positions, as well as with pans having no handles whatever.

A still further object of the present invention is to provide a strainer for foodstuffs as characterized above, which is simple and inexpensive to manufacture and which is rugged and dependable in operation.

The novel features which I consider characteristic of my invention are set forth with particularity in the appended claims. The device itself, however, both as to its organization and mode of operation, together with additional objects and advantages thereof, will best be understood from the following description of specific embodiments when read in connection with the accompanying drawings, in which:

FIGURE 1 is a perspective view of the subject strainer in conjunction with a container;
FIGURE 2 is a fragmentary side elevational view of the strainer and container of FIGURE 1;
FIGURE 3 is a side elevational view of the subject strainer;
FIGURE 4 is a top plan view of the strainer;
FIGURE 5 is a fragmentary sectional view of such strainer, taken substantially along line 5—5 of FIGURE 4; and
FIGURE 6 is a fragmentary sectional view, taken substantially along line 6—6 of FIGURE 4.

Like reference characters indicate corresponding parts throughout the several views of the drawings.

Referring to FIGURE 1 of the drawings, there is shown therein a strainer 10 according to the present invention for use with a pan or container 12. As will be readily apparent to those persons skilled in the art, the subject strainer 10 can be used with various different containers and pans, the container 12 in the drawings being merely for purposes of illustration.

Strainer 10 comprises a generally circular closed loop frame 14 which may be formed of substantially any appropriate material such as plastic, metal or the like. Such frame should be relatively stiff and firm, although it may be shaped to any desired configuration. It should, however, be of such material that can be kept clean and sterile, so that the entire unit can be used in conjunction with foodstuffs.

Across the frame 14 there is provided screening material 16 which may be formed of wire or plastic mesh having openings for permitting liquid to freely flow therethrough while preventing the flow of relatively small particles of food.

If wire mesh is employed for the screening material 16, the periphery thereof can be shaped to correspond to the shape of the frame 14, and it can be welded thereto as shown at 18 in FIGURE 6 of the drawings. On the other hand, if the screening material 16 is of plastic, the peripheral edge thereof can be firmly secured to the frame 14 by any appropriate means such as by the application of heat in the event the plastic is thermal-setting, or by the use of suitable bonding materials in the event such plastic is not thermal-setting. In any event, it is necessary for the screening material 16 to be firmly attached to the frame 14 so as to prevent the occurrence of relatively large gaps or openings through which food can easily pass.

At predetermined diametrically opposite locations 20 and 22 on frame 14, generally U-shaped grip means 24 are provided. At such locations, the screening material 16 is cut back as at 16a and 16b to afford access to the frame member 14 thereat for the fastening of the generally U-shaped grip means 24. In this regard, it is desirable to have the edges 16a and 16b of the screening material 16 closely approach the grip means 24 so as to prevent the occurrence of the aforementioned relatively large openings.

Each grip means 24 is formed with a relatively straight central portion 24a, a reversely bent mounting portion 24b and a curved thumb portion 24c. They may be formed of any appropriate material such as metal, plastic or the like, and the mounting portion 24b is preferably formed to approximate a circle. This particular configuration is desirable to permit grip means 24 to freely pivot on the frame 14. In this regard, it is to be realized that the frame 14 is preferably formed of circular wire or plastic. That is, in order to permit the grip means 24 to freely pivot thereon, it is desirable for the material of which frame 14 is formed to have a generally circular cross section as shown most clearly in FIG. 5 of the drawings. In the event material having a different cross section is utilized for frame 14, it is preferable to have the mounting portion of such frame reshaped to provide the desired circular cross section thereat.

The generally curved portion 24c of grip means 24 should be of such curvature as to conveniently and loosely receive the thumb of a person utilizing the subject strainer 10. It has also been found desirable to provide the short straight end portion 24d on each grip means 24 to provide means for preventing slippage of the person's thumb from the grip means.

As shown most clearly in FIGURES 1 and 2 of the drawings, the subject strainer 10 is employed over the open end 12a of a container 12. The screening material 16 is placed against the container 12 with the grip means 24 in depending manner on either side thereof. The grip means 24 should preferably be disposed outwardly as shown in the drawings to enable the user to conveniently place his thumbs within the grip means.

The user then grips the handles 12b of container 12 in conjunction with the grip means 24. It has been found preferable for the user to place his thumbs in the grip means and his fingers about the usual handle of the container. Thus, there is provided a unitary structure comprising the container 12 and strainer 10 thereon which can be conveniently manipulated by the user. That is, the entire container and strainer can be tilted so as to cause the liquid therewithin to run through the strainer while the foodstuffs are retained therein. The container and strainer thereon can be so manipulated as a unit, without in any way disturbing the relationship therebetween. It should be noted that exceptional manual dexterity is not required in that the hands continue to grip the grip means 24 and the container handle 12b throughout the entire operation.

It should also be noted that in the event the pan or container is without handles, the subject grip means 24 can be held with the usual flange or bead 12c which is formed at the top of a sauce pan or other container. That is, although certain pans are not provided with handles, virtually all of them are provided with such a flange or bead, and this can be gripped in conjunction with the subject strainer 10 to retain the strainer in place.

It should also be noted that each of the grip means 24 is free to pivot on the frame 14 thus enabling a given strainer 10 to be employed with pans or containers of different sizes. That is, for smaller containers the grip means 24 are free to swing inwardly, and for larger containers they can swing outwardly, in either event the size being easily accommodated.

Thus, it is seen that the present invention provides a strainer which can be used in conjunction with virtually any type of container, and which can be used effectively in straining foodstuffs without causing accidents.

Although I have shown and described certain specific embodiments of my invention, I am fully aware that many modifications thereof are possible. My invention, therefore, is not to be restricted except insofar as is necessitated by the prior art and by the spirit of the appended claims.

I claim:

1. A food strainer for use with any one of a plurality of different size open containers having oppositely disposed handles comprising in combination, a continuous wire formed to provide a closed endless frame encompassing a central opening larger than the opening of the largest of said containers, food straining mesh fixed to said frame so that said opening in said frame is covered thereby, and a pair of grips pivotally attached to said frame at substantially opposite locations thereon so that the grips can swing inwardly and outwardly of the edge of the frame and having reversely bent end portions at the end away from the pivotal attachment so that the grips can be pivoted to locate the bent end portions adjacent the handles of the container in use irrespective of the size of said container so that said strainer can be held against the opening of said container.

2. A food strainer for use with any one of a plurality of different size containers having oppositely disposed handles according to claim 1, wherein said grips are formed of relatively flat sheet material having an end portion wrapped about the wire of said frame to afford pivotal attachment therewith and having an opposite end portion reversely bent to facilitate gripping.

References Cited

UNITED STATES PATENTS

| | | | |
|---|---|---|---|
| 846,587 | 3/1907 | Maechler | 210—471 X |
| 1,187,498 | 6/1916 | Castle | 220—17 X |
| 2,106,453 | 1/1938 | Ekdahl | 210—469 |
| 2,505,114 | 4/1950 | Hayman et al. | 210—470 X |
| 3,301,404 | 1/1967 | Becker | 210—465 |

REUBEN FRIEDMAN, *Primary Examiner.*

C. M. DITLOW, *Assistant Examiner.*